United States Patent Office 3,437,898
Patented Apr. 8, 1969

3,437,898
DYNAMO-ELECTRIC MACHINE INCLUDING COMMUTATORS FED FROM ELECTRONIC DISCHARGE DEVICES
James John Bates, Esh Village, England, assignor to National Research Development Corporation, London, England, a corporation of Great Britain
Filed June 23, 1966, Ser. No. 559,869
Claims priority, application Great Britain, July 29, 1965, 32,571/65
Int. Cl. H02k *29/00;* H02p *1/16, 3/06*
U.S. Cl. 318—138　　　　　　　　　　　　　　　　6 Claims

ABSTRACT OF THE DISCLOSURE

A dynamo-electric machine having a low ratio of axial length to diameter including an armature having a winding formed from a plurality of separate coils wound on individual axes and connected together to form a closed winding, a pair of commutators each comprising conducting segments and intersegmental insulation, the intersegmental insulation having spans equal to the spans of the segments, a pair of current leads from supply terminals to the commutators wherein triggered electronic discharge devices are included in each of the current leads and wherein the commutators and pairs of brushes are positioned such that each supply terminal is always connected to a segment on at least one commutator and as the machine rotates it is intermittently connected to segments on both commutators simultaneously to complete circuital paths each embracing a pair of current leads and a triggered electronic discharge device included therein and an armature coil wherein extinction voltage generating means are included for applying extinction voltages through such circuital paths to a triggered electronic discharge device included therein during such intermittent connection.

---

This invention relates to dynamo-electric machines and is particularly concerned with machines which utilise commutators.

In United States patent application Ser. No. 533,181 which is assigned to the assignee of the present invention, there is disclosed an invention the object of which is to improve sliding contact commutation in dynamo-electric machines and overcome many of the defects of commutators. Broadly, in accordance with the said invention a dynamo-electric machine comprises an armature having a closed winding and two commutators each with a small number of segments separated by intersegmental insulation, the spans of the segments and insulation being equal. Leads from each supply terminal of the machine are taken to both commutators and a thyristor is included in each lead. Also each lead terminates in a pair of brushes the overall span of which equals the span of a commutator segment. The thyristors are not triggered to conduct until the leading brush of a pair lies wholly on a segment and the effect of the wide spacing between a pair of brushes insures that there is an adequate overlap period for commutation during which both leads are passing current. Extinction voltage generating means are provided for the thyristors, for example by interpoles which act at running speeds or by A.C. injection at slower speeds. In the above-disclosed arrangement each commutator has very many fewer segments than in a conventional commutator and each segment may span an appreciable arc of the rotor.

It is an object of the present invention to take advantage of the above-described commutator arrangement to provide a novel construction of dynamo-electric machine.

It is a further object of the invention to provide a machine of "pancake" form, that is a machine which has a low ratio of axial length to diameter.

In accordance with the present invention a dynamo-electric machine has a rotor comprising an armature winding in the form of a plurality of separate coils which are interconnected to form a closed winding.

In one construction embodying the invention, the axes of the coils extend radially of the rotor. In an alternative construction the axes of the coils extend parallel to the axis of the rotor and the stator poles have a U-shaped form.

In either construction the extinction voltage generating means may comprise pole-faces of the main field windings which are shaped to provide a progressively varying gap between the armature coils and the field poles as the rotor rotates. Thus the flux linking an armature coil increases as the coil moves towards the centre of a field pole and this will induce a voltage in the armature coils to effect commutation.

In order that the invention may be more fully understood reference will now be made to the accompanying drawings in which.

Figure 1:
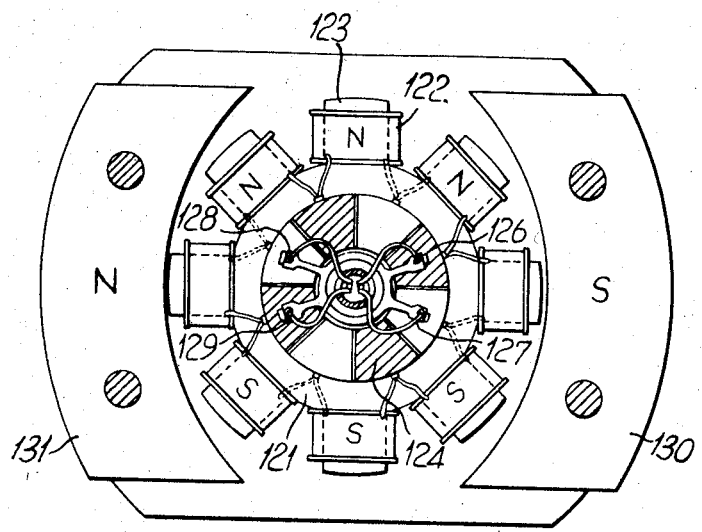
FIGURE 1 and FIGURE 2 are views looking parallel and perpendicular to the axis of a "pancake" machine having armature coils the axes of which are radial to the axis of the rotor.
Figure 2:
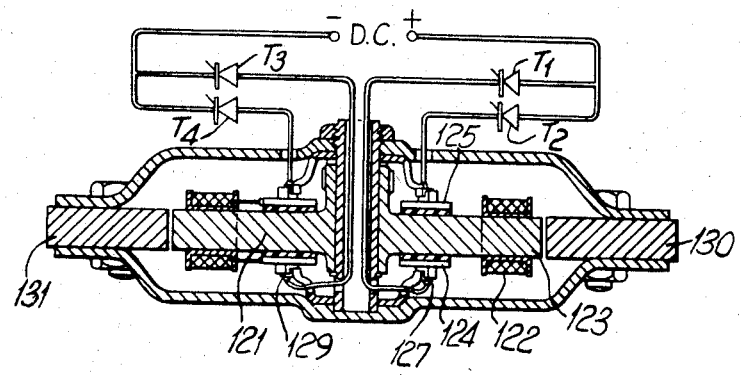

Referring now to FIGURE 1 and FIGURE 2 there is shown therein a novel arrangement of a D.C. electric motor the armature 121 whereof carries a plurality of coils 122 wound on tooth-like projections 123 extending radially of the armature. In the arrangement shown there are eight coils and they are connected together to form a closed winding.

The armature 121 carries two disc commutators 124 and 125 which are positioned on opposite sides of the armature and each of which commutators is provided with four segments of sectorial form. Connections are made to these segments from the junctions between adjacent armature coils 122 and successive junctions are connected alternately to each commutator in turn, the segments in one commutator being staggered relatively to the segments in the other commutator.

Each commutator is provided with two pairs of brushes. Thus commutator 124 has one pair of brushes 126 and 127 separated by not more than the span of an individual segment and a similar pair of brushes 128 and 129 positioned diametrically opposite the pair of brushes 126 and 127. The brushes of each pair are connected directly together, that is brushes 126 and 127 are connected together and similarly brushes 128 and 129 are connected together. Commutator 125 is provided with a similar set of two pairs of brushes in corresponding positions. As shown more clearly in FIGURE 2 the pair of brushes 126 and 127 are connected through a thyristor $T_1$ to the positive terminal of a D.C. supply while the pair of brushes 128 and 129 are connected through a thyristor $T_3$ to the negative terminal supply. In like fashion one pair of brushes lying on commutator 125 are connected through a thyristor $T_2$ to the D.C. positive terminal while the other pair of brushes are connected through a thyristor $T_4$ to the D.C. negative terminal. While a D.C. supply is illustrated it will be understood that any unidirectional voltage, for example a half-wave rectified A.C. supply, may equally well be used.

The triggering electrodes of the thyristors are arranged to be connected to brushes lying on an auxiliary commutator disc mounted on the same shaft as the armature which causes the triggering electrodes of thyristors $T_1$ and $T_3$ to be energised when the mid-point between the brushes 126 and 127 (and at the same time the mid-point between brushes 128 and 129) reached the boundary of a connected commutator segment. For clockwise rotation of the armature as viewed in FIGURE 1 this will occur in the position of the armature shown.

On triggering of thyristors $T_1$ and $T_3$ into their conducting state current will flow the positive D.C. supply terminal through thyristor $T_1$ and brush 126 to a segment of commutator 124 and thence through the armature coils 122 to brush 129 and thyristor $T_3$ to the negative D.C. supply terminal. Rotational torque will be produced in the armature in the conventional manner by reaction of the currents in the armature coils 122 with the magnetic flux generated by field poles 130 and 131. When the armature has rotated through a further eighth of a revolution similar conditions will occur in relation to the brushes lying on commutator 125 and it is arranged that at this instant triggering of thyristors $T_2$ and $T_4$ will occur.

To effect commutation it is necessary for the conductive path through commutator 124 to be broken and this is achieved by extinction of thyristors $T_1$ and $T_3$ by the generation of a reverse voltage across them. In some of the machines illustrated in the aforementioned specification this reverse voltage is generated by interpoles and interpoles may be used in machines embodying the present invention. However in the arrangement described herein it is achieved by arranging that the gap between the field poles 130 and 131 of the machine and the armature projections 123 varies so that the flux linking an armature coil 122 increases as the coil moves towards the centre of a field pole. This introduces a voltage in the coil which acts around the circuit formed by the simultaneously conducting thyristors $T_1/T_2$ and $T_3/T_4$ to extinguish thyristors $T_1$ and $T_3$.

An advantage of the construction illustrated in FIGURE 1 and FIGURE 2 is the very small ratio of length to diameter that is required and the extremely compact machine that is obtained. The construction also enables a high torque low speed machine to be obtained.

Figure 3:
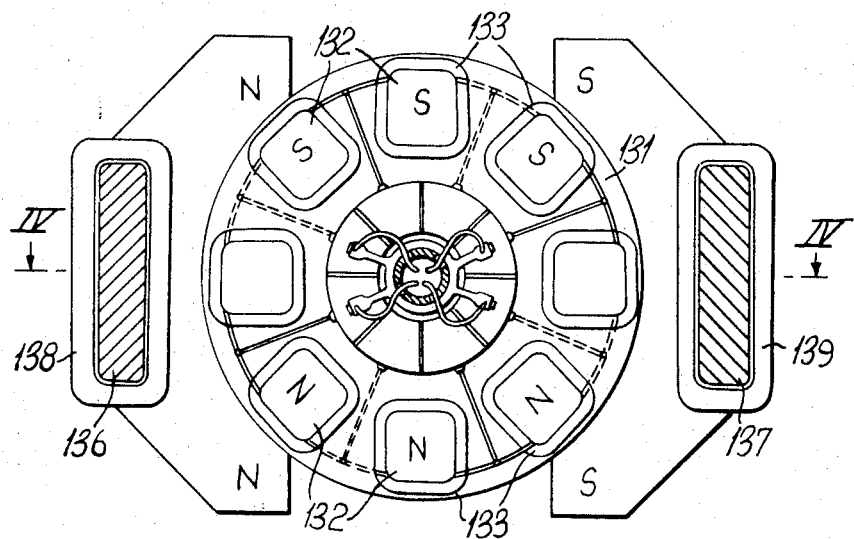
FIGURE 3 and FIGURE 4 are views looking parallel and perpendicular to the axis of a "pancake" machine in which the armature coils are parallel to the axis of the rotor.
Figure 4:
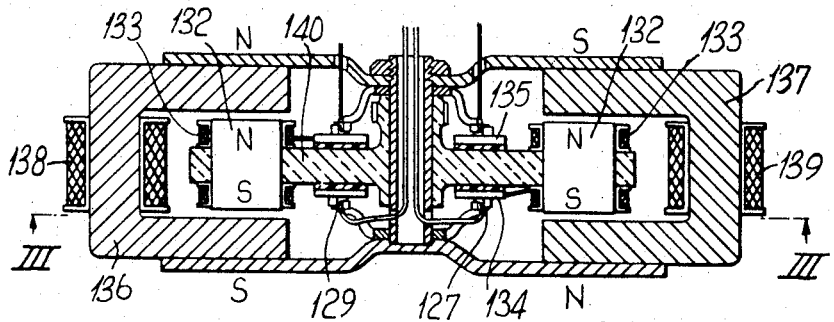

FIGURE 3 and FIGURE 4 illustrate an alternative embodiment of a machine having an armature 140 which is provided with eight stub arms 132 extending parallel to and spaced symmetrically around the shaft of the rotor. Coils are wound round the stub arms 132 and all the coils are connected together to form a closed winding in a manner similar to that illustrated in connection with FIGURE 1 and FIGURE 2. The armature carries two disc commutators 134 and 135 each provided with two pairs of brushes connected to a D.C. supply through thyristors in like manner to FIGURE 1 and FIGURE 2. The field poles in the machine illustrated in FIGURE 3 and FIGURE 4 comprise U-shaped members 136 and 137 each carying windings 138 and 139 which produce a similar tapering field as in the arrangement shown in FIGURE 1 and FIGURE 2.

The machine illustrated in FIGURES 3 and 4 operates in like manner to the machine illustrated in FIGURE 1 and FIGURE 2 and it will be seen that only a small part of the armature needs to be constructed of ferromagnetic material and the electric and magnetic circuits are very closely interlinked.

I claim:
1. A dynamo-electric machine comprising:
an armature having a winding comprising a plurality of separate coils wound on individual axes and connected together to form a closed winding;
a pair of commutators each comprising conducting segments and intersegmental insulation, the intersegmental insulation having spans equal to the spans of the segments;
connections from between each coil of the armature winding taken to each commutator in turn;
a pair of current leads from each supply terminal to the commutators, the individual leads of a pair being taken to respective commutators;
triggered electronic discharge devices included in each of the current leads;
a pair of brushes bearing on a commutator terminating each of the current leads, the span of a commutator segment being at least as great as the overall span of a pair of brushes bearing thereon;
the commutators and pairs of brushes being so positioned that each supply terminal is always connected to a segment on at least one commutator and as the machine rotates is intermittently connected to segments on both commutators simultaneously to complete circuital paths each embracing a pair of current leads and the triggered electronic discharge devices included in them and an armature coil; and
extinction voltage generating means for applying extinction voltages through such circuital paths to a triggered electronic discharge device included therein during such intermittent connection.

2. The machine as claimed in claim 1 in which the axes of said coils extend radially of the rotor.

3. The machine as claimed in claim 1 in which axes of the coils extend parallel to the axes of rotation of the rotor.

4. The machine as claimed in claim 3 including pole pieces associated with field windings of the machine wherein said pole pieces are U-shaped.

5. The machine as claimed in claim 1 in which the extinction voltage generating means comprises pole faces of the field windings which are shaped in a manner such that the air gap between the stationary and rotating parts of the machine is less at the centre of the pole faces than at their outer edges.

6. A dynamo-electric machine comprising:
an armature having a winding comprising a plurality of separate coils wound on individual axes and connected together to form a closed winding;
a pair of commutators each comprising conducting segments and intersegmental insulation, the intersegmental insulation having spans equal to the spans of the segments;
connections from between each coil of the armature winding taken directly to each commutator in turn;
a pair of current leads from each supply terminal to the commutators, individual leads of a pair being taken to respective commutators;
triggered thyristor devices electrically coupled between the supply terminals and the commutators and located in fixed positions a distance away from said armature;
a pair of brushes bearing on a commutator terminating each of the current leads, the span of a commutator segment being at least as great as the overall span of a pair of brushes bearing thereon;

the commutators and pairs of brushes being so positioned that each supply terminal is always connected to a segment on at least one commutator and as the machine rotates is intermittently connected to segments on both commutators simultaneously to complete circuital paths each embracing a pair of current leads and the triggered thyristor discharge devices included in them and an armature coil; and extension voltage generating means for applying extinction voltages through said circuital paths to a triggered one of said thyristor devices included therein during such intermittent connection.

References Cited

UNITED STATES PATENTS

| | | | |
|---|---|---|---|
| 2,595,024 | 4/1952 | Toulon | 307—136 |
| 3,042,847 | 7/1962 | Welch | 318—254 |
| 3,131,341 | 4/1964 | Kniazeff | 318—138 |

ORIS L. RADER, *Primary Examiner.*

G. R. SIMMONS, *Assistant Examiner.*

U.S. Cl. X.R.

307—136; 310—220; 318—439